United States Patent
Berg et al.

(10) Patent No.: US 7,900,915 B2
(45) Date of Patent: Mar. 8, 2011

(54) DEVICE FOR TRANSPORTING AND WEIGHING LETTERS

(75) Inventors: Nora Berg, Kaiserslautern (DE); Michael Rothfuchs, Bedesbach (DE)

(73) Assignee: Wipotec Wiege-und Positioniersysteme GmbH, Kaiserslautern (DE)

(*) Notice: Subject to any disclaimer, the term of this patent is extended or adjusted under 35 U.S.C. 154(b) by 156 days.

(21) Appl. No.: 12/323,011

(22) Filed: Nov. 25, 2008

(65) Prior Publication Data

US 2009/0134568 A1    May 28, 2009

(30) Foreign Application Priority Data

Nov. 28, 2007   (DE) .................. 20 2007 016 722 U

(51) Int. Cl.
*B65H 5/00*    (2006.01)
*B65H 5/02*    (2006.01)

(52) U.S. Cl. ......................... 271/264; 271/272

(58) Field of Classification Search .......... 271/272, 271/264; 177/145; 198/626.1, 959
See application file for complete search history.

(56) References Cited

U.S. PATENT DOCUMENTS

| | | | |
|---|---|---|---|
| 3,861,480 A | 1/1975 | Zucker et al. | |
| 4,836,311 A * | 6/1989 | Hubbard | 177/145 |
| 5,014,797 A | 5/1991 | Dolan et al. | |
| 5,511,774 A | 4/1996 | Lyga | |
| 6,265,675 B1 * | 7/2001 | Hubler et al. | 177/25.15 |
| 7,080,836 B2 | 7/2006 | Hamada et al. | |
| 7,141,745 B1 * | 11/2006 | Schoon et al. | 177/25.15 |
| 2002/0166704 A1 * | 11/2002 | Miller et al. | 177/145 |

FOREIGN PATENT DOCUMENTS

| | | |
|---|---|---|
| DE | 196 05 015 C1 | 3/1997 |
| DE | 196 04 090 A1 | 8/1997 |
| DE | 699 15 699 T2 | 2/2005 |
| EP | 0 440 262 A2 | 2/1991 |
| EP | 1 003 684 B1 | 3/2002 |
| EP | 1 362 644 A1 | 11/2003 |
| EP | 2 071 303 A1 | 6/2009 |
| GB | 2 232 147 A | 12/1990 |
| JP | 401028144 A * | 1/1989 ............ 271/272 |
| JP | 401028146 A * | 1/1989 ............ 271/272 |
| JP | 404213535 A * | 8/1992 ............ 271/272 |

OTHER PUBLICATIONS

German Search Report, German Application No. 20 2007 016 722.9, Oct. 15, 2008 (8 pages).
European Search Report, European Application No. 08 020 772.3-1236, Mar. 31, 2009 (9 pages).

* cited by examiner

*Primary Examiner* — David H Bollinger
(74) *Attorney, Agent, or Firm* — The Culbertson Group, P.C.

(57) ABSTRACT

Device for the transport and weighing of letters, wherein the letter is conveyed between at least two conveyance elements and is stabilized laterally outside the conveyance elements by at least one guide element so that a deflection or fluttering of the letter can be reduced or avoided, at least when the letter is seized at its front edge by the transport elements.

17 Claims, 1 Drawing Sheet

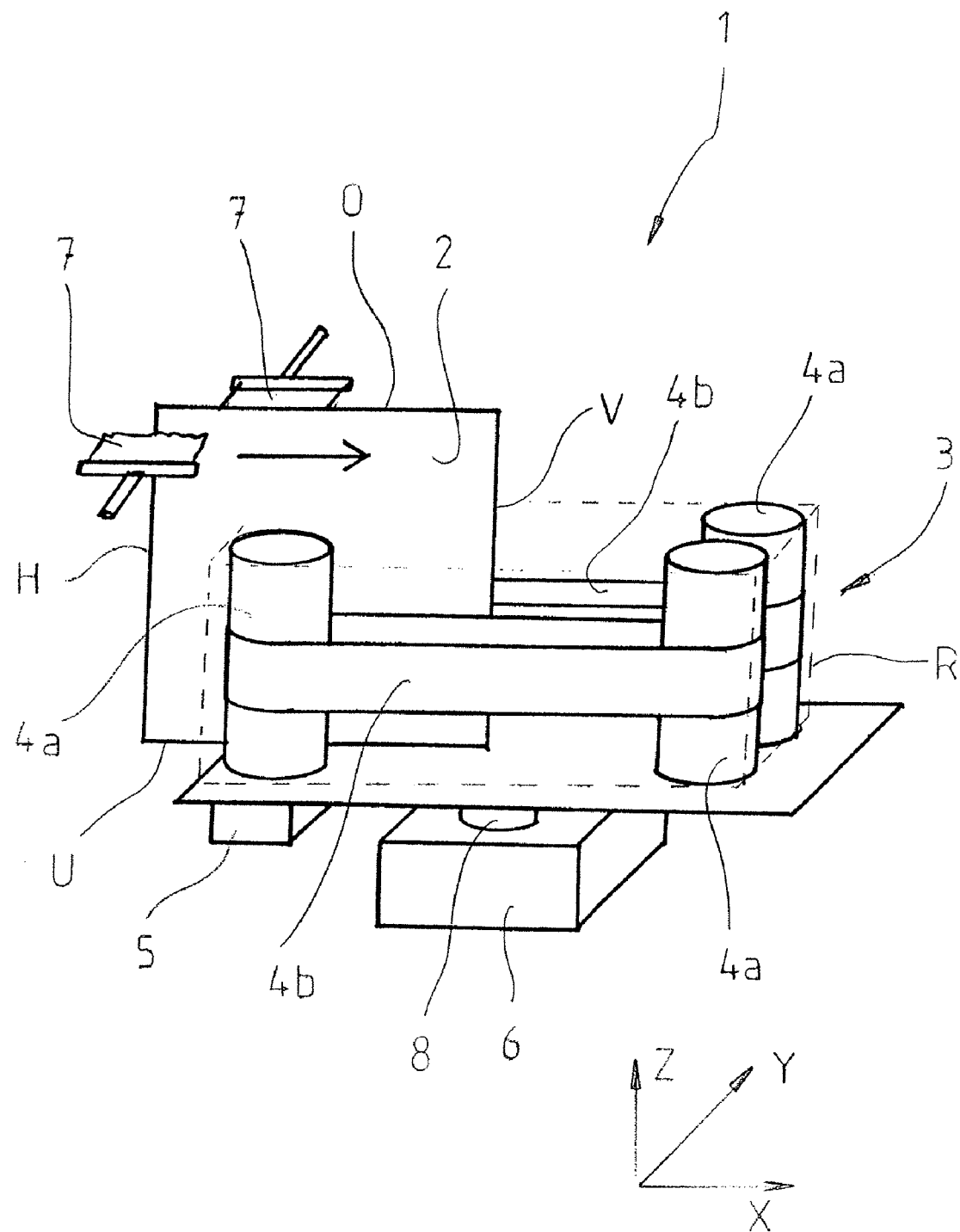

DEVICE FOR TRANSPORTING AND WEIGHING LETTERS

TECHNICAL FIELD OF THE INVENTION

The present invention relates to a device for transporting and weighing objects that pass the device one after the other.

BACKGROUND OF THE INVENTION

Devices for transporting and weighing objects that pass the device in a serial manner are particularly known from letter processing. In letter distribution centers, the letters are supplied sequentially and in rapid succession to a scale in order to determine their weight there. The letters are usually transported on edge or upright and are subsequently supplied to a transport unit arranged on a weighing cell. The weight of this transport unit is coupled to the load receiver of a weighing cell so that the weight of the letter present in the transport unit can be detected and processed.

The weighing is preferably done in rapid succession, so that the letters are moved at high speed, whereby the residence time in the transport unit that is available for weighing technology to detect the weight becomes small. The mass and shape of the letter has detrimental effects on the settling process of the measurement signal from the weighing cell. Thus, deflection movements or air currents that unintentionally influence the measurement cell can act on the letter held in the transport unit. The type and size or mass of the transport unit seated on the weighing cell can also falsify the measurement result. A large and therefore inertial mass slows the settling process of the measurement signal. An imbalance in the moved part likewise leads to measuring errors. A large surface area leads to increased wind sensitivity.

A device for printing on a print substrate situated on its edge is described in DE 196 05 015 C1. The printing substrate is pressed by pressing elements against a guide plate so that it is positively held during transport and the printing process. The device is not suitable for weighing, and the guide plate is relatively large.

The present invention addresses the problem of weight measurement errors in devices that transport a series of objects and weigh the objects in rapid succession.

SUMMARY OF THE INVENTION

The invention is based on the consideration that undesired movements, vibrations or deflections of the transported letter can be reduced with the aid of guide elements, which is helpful particularly at the moment when the letter is being seized and moved by the transport unit seated on the weighing cell. With the aid of the guide elements according to the invention, a lateral stabilization of the letter is achieved, so that it retains its substantially two-dimensional form and, in particular, fluttering or (gravity-induced) bending of the letter in its vertical orientation is avoided during transport. This stabilization is intended according to the invention to take place when the letter is being seized completely or partially by the transport unit on the weighing cell in order to be weighed.

A first embodiment of the invention provides a device for transporting and weighing objects passing the device in succession, wherein the objects can be, in particular, letters The latter preferably extend in a first direction X and a second direction Z perpendicular thereto, and are transported with a front edge pointed forward in the conveyance direction and a back edge turned away from the conveyance direction.

The device comprises a transport unit that can be supplied with letters by a feeding device directly upstream. The transport unit is coupled as a preload to the load receiver of a weighing cell in order to detect the weight of the letters by means of the weighing cell before or during further conveyance (i.e., in continuous transport or also in start/stop operation). The transport unit here is constructed to receive the letters starting with their front edge.

The transport unit has at least two opposing transport elements that form a nip for a letter arranged between them, and contact it on both sides in order to transport it between them. At least one of these transport elements—preferably roller-like or belt-like—can be driven in order to bring about the transport of the object or letter. "Transport element" in the sense of the present invention is to be understood in particular as an element of the transport unit that directly applies a force in the direction of transport to the object. The section that supports the object in the Y direction in the area of the nip, but is not driven, can also be a "transport element."

The spatial dimensions of the transport elements forming the nip circumscribe, in their arrangement on the transport unit in the X, Y and Z directions, a space (R) that is selected to be as small as possible, by keeping the transport elements small. This takes place in order to keep the masses coupled to the weighing cell small and to reduce or avoid influences on the weighing result due to vibration or imbalance of these masses. Therefore the rollers or transport belts between which the letter is conveyed are constructed as short as possible in their axial direction (Z) and if possible, in their diameter as well. This has the effect that the letter is gripped or held during transport by means of the transport unit only inside this "space," it being possible however for the letter as a whole to extend outwards beyond this space in the X and Z directions.

According to the invention, at least one guide element is provided outside the space (R), which applies a guidance force to the letter in a direction Y perpendicular to the directions X and Z, in order to avoid a lateral deflection or fluttering of the letter in this area when the transport unit has gripped or drawn in the object at its front side. A force running obliquely to X, Y and Z should also be understood here as a guidance force, so long as it comprises a component in the Y direction.

The at least one guide element can be arranged, for example, above the above-described space (R), in order to stabilize the letter, particularly in the area of its upper edge. Insofar as the transport elements draw in or transport the letter at a sufficient distance from its lower edge, the arrangement of one or more guide elements underneath the transport elements can also make sense in order to stabilize the letter, particularly in the area of its lower edge, or to damp or prevent vibrations.

A particularly advantageous embodiment further provides that at least one guide element is arranged immediately upstream, in the direction of conveyance, of the transport unit or the space circumscribed by its transport elements, in order to achieve a lateral stabilization or settling in the area of the rear edge of the letter when the letter is grasped and drawn in by the transport unit. Finally, the arrangement of guide elements in the area downstream of the above-mentioned space makes sense if the letter is to be settled in the area of its front edge when leaving the transport unit.

Thus, the letter is to be held as much as possible in the X-Z plane with the aid of the guide elements according to the invention. In particular, movements or deflections of individual letter areas in the Y direction (i.e., at the front, top, bottom or rear edge) are to be effectively suppressed. Then the "settled down" letter can be received and transported by the transport unit or weighed by the weighing cell, without interfering vibrations having an influence on the settling process and the measurement result.

For instance, if the letter is drawn in between two opposing rollers of the transport unit, then the free rear end of the letter can be oriented in precise alignment by the guide elements in order to suppress lateral vibration forces while the letter is being further drawn in up to its rear edge. Alternatively or additionally, guide elements according to the invention can also be arranged above or below the transport unit in order to stabilize the letter laterally in the area of its top and bottom edge. This advantage according to the invention becomes particularly important whenever the transport unit is relatively shallow and small or lightweight in construction relative to the letter to be transported.

A letter projecting past the transport unit at the top or the bottom, which tends to fall over, bend or flutter as a result of its dimensions, is just as much laterally stabilized by the guide elements according to the invention as are the free ends of the letter projecting forward or backward out of the transport unit if suitable guide elements are arranged there. In essence, the letter thus retains its two-dimensional shape, and vibrations or relative movements in the Y direction can be avoided along the entire letter, depending on the design and size of the guide elements.

According to one advantageous embodiment of the invention, the at least one guide element is constructed separately from the transport unit or the weighing cell. The separate construction reduces the preload and offers constructive freedom for designing and arranging the guide elements apart from the weighing cell.

Alternatively or additionally, the guide elements can also be connected to the weighing cell or the transport unit coupled to it. This is an option particularly if the guide elements stabilize the letter while it is being weighed. The guide elements are then preferably arranged above or below the transport elements, since the letter is typically weighed while it is passing through the transport unit. In this case, force shunting is to be avoided, so that the guide elements expediently form a part of the preload for the weighing cell. Guide elements upstream or downstream of the transport elements are also conceivable as part of the preload.

The at least one guide element is advantageously furnished according to an additional embodiment of the invention with a yielding or elastic contact means acting on the letter in the Y direction. In particular, this can be a type of brush whose bristles are yielding in construction and which takes on the stabilization function largely independently of the letter's thickness. Without changing or adapting the guide elements, letters of different thickness can be transported, weighed and simultaneously stabilized or calmed down in this way. Other elastic contact means (coatings, resilient surfaces, etc.) can be considered as well.

According to an advantageous embodiment of the invention, the at least one guide element is antistatic, conductive or suitable for discharging electrostatic charges to the letters. Any static charges on the letter can thus be diverted before, or at the latest while, the letter is being completely picked up or drawn in by the transport unit, in order to avoid erroneous measurements that can be caused by such electrostatic charges.

The guide elements according to the invention can be arranged in various manners. Thus, it is conceivable for them to be arranged on only one side of the letter in order to act on it from one side. Alternatively or additionally, further guide elements can be provided, which are arranged on different sides of the letter. They can be directly facing one another relative to the X-Z plane and/or be arranged offset from one another in the X direction and/or the Z direction, if the designed construction requires this or is facilitated by it. Thus, guide elements offset with respect to one another in the conveyance direction or in the vertical direction are just as conceivable as two directly opposing elements that form a nip for the letter and stabilize or "calm" it in the positive and negative Y direction.

A method according to the invention would contain, for one of the above-described devices, a step according to which a guiding force is applied to the object outside the space (R) in a direction Y perpendicular to the X and Z directions by at least one guide element and the object is guided or calmed in order to avoid lateral deflection or fluttering of the object, particularly in the area of its edges (O, V, H, U), when the transport unit has seized or drawn in the object at its front edge.

These and other advantages and features of the invention will be apparent from the following description of an illustrative embodiment, considered along with the accompanying drawing.

BRIEF DESCRIPTION OF THE DRAWING

The FIGURE comprises a somewhat diagrammatic view in perspective of a device according to one preferred form of the invention for conveying and weighing letters.

DESCRIPTION OF ILLUSTRATIVE EMBODIMENT

One embodiment of the invention will be described below with reference to the above-described illustrative FIGURE. The FIGURE shows a device 1 for conveying and weighing letters 2. A transport unit 3 is arranged here on the load receiver 8 of a weighing cell 6. It comprises four transport rollers 4a, which extend substantially vertically upward in the Z direction; an additional transport element 4b constructed as a transport belt runs around each pair of these. Between rollers 4a, or transport belts 4b, a nip is preferably formed that clamps a letter 2 introduced therein to a predetermined extent, so that it can be conveyed in the X direction by rotation of rollers 4a. Transport unit 3 is driven by a motor 5.

The dimensions of transport elements 4a, 4b in the X, Y and Z direction circumscribe a space R indicated in dash-lines, which comprises the area in which the letter is impinged on from both sides and driven for transport.

Upstream of and above the space R, two guide elements 7 are arranged in order to stabilize letter 2 laterally in the area of its upper edge O or rear edge H, i.e., in the Y direction. According to the invention the stabilization effect should be in existence particularly when letter 2 has already been drawn by its front edge V into transport unit 3 or has been seized by the latter.

Guide elements 7 are provided with a brush-like contact means for a particularly gentle and flexible stabilization or "calming" of letter 2. The contact means flexibly adapts to the thickness of letter 2, without the necessity of adapting the spacing of guide elements 7 to letter 2 in each case. It is additionally recognizable that guide elements 7 are arranged opposing one another and offset in the X direction from one another. Such an offset can alternatively or additionally also be selected in the Z direction. Additional guide elements 7 directly facing one another, or exclusively that type, are likewise conceivable.

When letter 2 is drawn in by transport unit 3 in the X direction represented as an arrow, this takes place with the front edge V preceding. While letter 2 experiences a certain stabilization inside the space R or in the area of the opposing transport rollers 4a, there is at first a lack of such stabilization upstream, i.e., upstream of transport unit 3 and also above transport rollers 4a. In the area of the rear edge H, letter 2 could vibrate laterally, this vibration possibly being transmitted via transport unit 3 to weighing cell 6 and having an undesired influence on the weighing result. In the area of the upper edge O of letter 2, it could also move laterally or be deflected in the Y direction by air currents or its own weight. Such relative movements also have an effect on the highly sensitive weighing cell 6.

In order to avoid the above-mentioned influences, guide elements 7 are therefore provided, which are provided particularly for additional lateral stabilization of the letter, preferably in the area of the upper edge O or the rear edge H, when the letter has been partly or completely picked up or drawn in by the transport unit.

The invention claimed is:

1. A device for the transport and the weighing of objects successively passing by the device, in particular letters, wherein the objects extend in a first direction (X) and a second vertical direction (Z) perpendicular thereto, with a surface facing a third direction (Y) perpendicular to the X and Z directions, and wherein the objects are conveyed, coming from a supply device, with a front edge in the lead, an upper edge facing upwards, a lower edge facing downwards and a rear edge facing away from the conveyance device, to an immediately following transport unit, the device further comprising:
   a) a transport unit coupled as a preload to a weighing cell in order to detect the weight of the objects by means of the weighing cell during further conveyance;
   b) the transport unit comprising at least two opposing transport elements that form a nip in order to convey an object between them, and of which at least one transport element is drivable;
   c) the spatial dimensions of the transport elements of the transport unit that form the nip circumscribing a space in the X, Y, and Z directions;
   d) wherein the transport unit is constructed to take up the object starting with its front edge in order to convey it further; and
   e) wherein at least one of one or more guide elements is provided outside the space, which applies a guidance force to the object in the direction Y perpendicular to the directions X and Z in order to avoid a lateral deflection or fluttering of the object, particularly in the area of its edges, when the transport unit has seized or drawn in the object at its front edge.

2. The device of claim 1, wherein the at least one guide element comprises an elastic contact means acting on the object in the Y direction.

3. The device of claim 2, wherein the elastic contact means is a type of brush.

4. The device of claim 1, wherein the at least one guide element is constructed as a part of a preload of the weighing cell.

5. The device of claim 4, wherein the at least one guide element comprises an elastic contact means acting on the object in the Y direction.

6. The device of claim 5, wherein the elastic contact means is a type of brush.

7. The device of claim 1, wherein several guide elements:
   a) are arranged on a same side of the object in order to impinge on it from one side; or
   b) are arranged on different sides of the object in order to impinge on it from both sides, wherein the guide elements are arranged facing one another relative to the X-Z plane or are offset with respect to one another in the X or Z direction.

8. The device of claim 7, wherein the several guide elements are constructed as a part of a preload of the weighing cell.

9. The device of claim 8, wherein the guide elements are not simultaneously transport elements.

10. The device of claim 7, wherein the device is constructed for weighing objects while they are moving.

11. The device of claim 7, wherein the at least one guide element comprises an elastic contact means acting on the object in the Y direction.

12. The device of claim 1, wherein the transport elements opposing one another and receiving the object between one another are constructed identically or symmetrically with respect to an X-Z plane lying between them.

13. The device of claim 1, wherein the guide elements are not simultaneously transport elements.

14. The device of claim 1, wherein the device is constructed for weighing objects while they are moving.

15. The device of claim 1, wherein the space is shorter in the vertical direction Z, than the height of the object in the Z direction.

16. The device of claim 1, wherein the transport element is roller-like or belt-like.

17. A device for the transport and the weighing of objects successively passing by the device, in particular letters, wherein the objects extend in a first direction (X) and a second vertical direction (Z) perpendicular thereto, with a surface facing a third direction (Y) perpendicular to the X and Z directions, and wherein the objects are conveyed, coming from a supply device, with a front edge in the lead, an upper edge facing upwards, a lower edge facing downwards and a rear edge facing away from the conveyance device, to an immediately following transport unit, the device further comprising:
   a) a transport unit coupled as a preload to a weighing cell in order to detect the weight of the objects by means of the weighing cell during further conveyance;
   b) the transport unit comprising at least two opposing transport elements that form a nip in order to convey an object between them, and of which at least one transport element is drivable;
   c) the spatial dimensions of the transport elements of the transport unit that form the nip circumscribing a space in the X, Y, and Z directions;
   d) wherein the transport unit is constructed to take up the object starting with its front edge in order to convey it further;
   e) wherein at least one of one or more guide elements is provided outside the space, which applies a guidance force to the object in the direction Y perpendicular to the directions X and Z in order to avoid a lateral deflection or fluttering of the object, particularly in the area of its edges, when the transport unit has seized or drawn in the object at its front edge;
   f) wherein the at least one guide element comprises an elastic contact means acting on the object in the Y direction; and
   g) wherein the guide element or the contact means is constructed to be antistatic, conductive or capable of discharging static charge from the object.

* * * * *